United States Patent

[11] 3,626,098

[72] Inventor John H. Lee
Saint Paul, Minn.

[21] Appl. No. 852,600
[22] Filed Aug. 25, 1969
[45] Patented Dec. 7, 1971
[73] Assignee Minnesota Mining and Manufacturing Company
St. Paul, Minn.

[54] ALARM SYSTEM
18 Claims, 21 Drawing Figs.

[52] U.S. Cl. .......... 179/5 R
[51] Int. Cl. .......... H04m 11/04
[50] Field of Search .......... 177/5, 6, 100; 178/79, 83

[56] References Cited

UNITED STATES PATENTS

| | | | |
|---|---|---|---|
| 3,132,212 | 5/1964 | Zimmerman | 179/5 X |
| 3,284,572 | 11/1966 | Hesselgren | 179/5 |
| 3,369,079 | 2/1968 | Glidden | 179/5 |

*Primary Examiner*—Kathleen H. Claffy
*Assistant Examiner*—William A. Helvestine
*Attorney*—Kinney, Alexander, Sell, Steldt and Delahunt

ABSTRACT: A timer is included in an alarm system for enabling termination of message transmission from the alarm system. In an alarm system of the type wherein in response to a sensed alarm condition an information storage and retrieval unit operates a dial pulse switch to dial a telephone number stored in the information storage and retrieval unit and causes a message also stored therein to be repetitively transmitted over telephone lines, the timer is coupled to the information storage and retrieval unit and actuated to operate simultaneously therewith. Upon completion of a predetermined interval, the timer provides a signal to the information storage and retrieval unit for enabling termination of the message transmission. Transmission is thereafter terminated upon the provision of an end-of-message indication from the information storage and retrieval unit.

INVENTOR.
JOHN H. LEE
BY Kinney, Alexander, Sell, Steldt & De La Hunt
ATTORNEYS

INVENTOR.
JOHN H. LEE
BY Kinney, Alexander,
Sell, Steldt & De La Hunt
ATTORNEYS

INVENTOR.
JOHN H. LEE
BY Kinney, Alexander,
Sell, Steldt & De La Hunt
ATTORNEYS

INVENTOR.
JOHN H. LEE
BY Kinney, Alexander, Sell, Steldt & DeLaHunt
ATTORNEYS

INVENTOR.
JOHN H. LEE
BY Kinney, Alexander,
Sell, Steldt & De La Hunt
ATTORNEYS

INVENTOR.
JOHN H. LEE
BY Kinney, Alexander,
Sell, Steldt & De La Hunt
ATTORNEYS

INVENTOR.
JOHN H. LEE
BY Kinney, Alexander, Sell, Steldt & De La Hunt
ATTORNEYS

INVENTOR.
JOHN H. LEE
BY Kinney, Alexander,
Sell, Steldt & De La Hunt
ATTORNEYS

ALARM SYSTEM

BACKGROUND OF THE INVENTION

The present invention relates to an alarm system of the type wherein in response to a sensed alarm condition, such as a fire or intrusion, a telephone number of a receiver at a remote location is automatically dialed on the telephone lines and a message indicating the alarm condition and/or the location thereof is transmitted over the telephone lines to an alarm receiver at the remote location.

The present invention relates to the type of alarm system wherein a predetermined dialing number and a predetermined message are stored in an information storage and retrieval unit, which, upon being actuated in response to the sensed alarm condition, causes a dial pulse switch to operate to dial the predetermined dialing number on the telephone lines and then causes the predetermined message to be transmitted over the telephone lines by a message transmitter.

The known prior art to which the present invention relates is typified by U.S. Pat. No. 3,206,551 to Crowson et al.; and U.S. Pat. No. 3,369,079 to Glidden. In some alarm systems, a cycle of dialing the predetermined number and transmitting the predetermined message is repeated a predetermined number of times or until a return signal is received from the remote location acknowledging the receipt of the transmitted message. A counter is commonly used to count the number of cycles.

The Glidden alarm system makes use of a rotatable disc which is coated with a conductive material and which contains nonconductive strips arranged along the circular track to define a series of dialing pulse trains representative of a predetermined dialing number, wherein each dialing pulse train contains a number of pulses representative of a separate digit of the predetermined dialing number. However, although the contacts. Also, these conductive wipers patent states that the "disc may be provided with additional nonconductive strips whereby coded signals may be dispatched through the telephone lines to a receiving station," there is no description of such a system whereby a coded signal (predetermined message) can be so dispatched. Also, the conductive wipers used in the telephony art are of such size and configuration that in order to have the proper spacing between the pulses and the pulse within each train it would be necessary that the rotatable disc either be quite large in diameter or severely restricted in space for message storage. These conductive wipers are generally either relatively thick or are bent at the point of engagement with the stationary contacts. Alsoq these conductive wipers engage the stationary contacts at a relatively small angle. These characteristics are generally for the purpose of assuring that contact is made between the conductive wiper and the stationary contacts and also for assuring a long life for the conductive wiper and the stationary contacts.

SUMMARY OF THE INVENTION

The present invention provides an alarm system in which a timer operates for a predetermined interval commencing upon the actuation of the information storage and retrieval unit. Upon completion of the predetermined interval, a signal is sent to the information storage and retrieval unit from the timer enabling the termination of the message transmission.

Another feature of the present invention is that the information storage and retrieval unit includes a rotatable disc such as a rotatable printed circuit board upon which a predetermined dialing number is stored in the form of conductive elements located along a first circular track and defining a series of dialing pulse trains, wherein each dial pulse train contains a number of pulses representative of a separate digit of the stored predetermined dialing number and upon which a predetermined message is stored in the form of conductive elements located along a second circular track and defining a series of message pulse trains wherein each message pulse train contains a number of pulses representative of a separate character of the predetermined message. Separate conductive wipers are provided for engaging the conductive elements in the two circular tracks when the disc rotates. A first conductive wiper is operatively coupled to a dial pulse switch for causing the dialing of the predetermined number when the disc rotates and a second conductive wiper is operatively coupled to a message transmitter for then causing the transmission of the predetermined message as the disc continues to rotate. The conductive wipers are disposed in relation to each other and in relation to the conductive elements in the circular tracks so that the message transmission is subsequent to the dialing of the predetermined number. The predetermined message is stored along the second circular track a plurality of times so that the message is transmitted a plurality of times for each dialing of the predetermined dialing number.

The present invention in its various embodiments provides several additional features. One feature is the provision of a conductive wiper which is an ultrathin, relatively straight blade which engages the conductive elements on the rotatable disc at a relatively sharp angle thereto. By the use of such a conductive wiper, the density of the conductive elements may be greatly increased, thereby increasing the information storage capacity of the rotatable disc and thereby enabling the rotatable disc to be smaller.

Another feature of the present invention is that the rotatable disc contains a conductive element which is disposed in relation to the conductive elements of the first and second circular tracks and in relation to the conductive wipers such that when it is contacted by a conductive wiper, an indication is provided that the conductive elements along the second circular track which represent the stored predetermined message have been completely scanned and that the scanning of the conductive elements along the first circular track has not again commenced. This conductive element, which indicates the end of a message transmission, is of such dimensions that when contacted by one of the conductive wipers located for scanning the first and second circular tracks, it is recognized as an end-of-message indicator rather than as a pulse of a dialing pulse train or of a message pulse train. When this end-of-message indicator conductive element is contacted by the wiper, the information storage and retrieval unit is enabled for terminating rotation of the rotatable disc at a position following the furnishing of the predetermined message and before the redialing of the stored predetermined dialing number so that the disc may stop at this location provided that it is also additionally enabled for so stopping by another indication such as a return signal received from the remote location acknowledging the receipt of the transmitted predetermined message or such as the signal furnished by the timer upon completion of the predetermined interval.

Still another feature of the present invention is the provision of a system control circuit, which, in response to the sensing of an alarm condition, operates a line seizure switch to remove the telephone lines from connection with a telephone and to connect the telephone lines to the alarm system of the present invention; provides a signal to the information storage and retrieval system to actuate the same; and provides a signal to the timer for starting the timer at the same time as the information storage and retrieval unit is actuated. At the end of the predetermined interval for which the timer is constructed the system control circuit receives a signal from the timer indicating the end of the interval and in response to this signal operates the line seizure switch to return the telephone lines to the telephone. The system control circuit is also connected to a return-tone receiver which is in turn connected to the message transmitter to receive a return signal from the remote location over the telephone lines. When the receipt of a return signal by the return-tone receiver is indicated to the system control circuit, such an indication enables the system control circuit to transmit to the information storage and retrieval unit a signal which enables the termination of the rotation of the rotatable disc upon the disc rotating to the end-of-message location. This indication also causes the system control circuit to operate the line seizure switch to return the telephone lines from the alarm system to the telephone. The information storage and retrieval unit is connected to the return-tone receiver for suppressing any indication from the return-tone receiver to the system control circuit during such time as the stored predetermined message is being provided to the message transmitter so as to prevent a false return-tone indication from being provided to the system control circuit during a transmission of the predetermined message.

A further additional feature of the present invention is that the information storage and retrieval unit is combined with an alarm message programmer circuit for the purpose of enabling the information storage and retrieval unit to furnish to the message transmitter a stored message indicating the type of alarm condition which is indicated to the alarm message programmer from an alarm condition indicator. The type of alarm condition is represented by the number of pulses in a message pulse train which is furnished to the message transmitter. The corresponding area of the rotatable disc contains a number of conductive pulse elements equal to the number of different alarm conditions as to which the alarm system may respond. Thus, when the indicated alarm condition is represented by one pulse, the alarm message programmer enables the information storage and retrieval unit to furnish only a single pulse to the message transmitter from the corresponding area of the rotatable disc.

An additional feature of the present invention is the method of manufacturing the rotatable disc used in the information storage and retrieval unit. To prepare the rotatable disc a dielectric board such as a printed circuit board is prepared with the conductive material in a pattern defining a series of dialing pulse trains and a series of message pulse trains, wherein each pulse train contains the number of pulse elements which would be applicable for the highest order digit or character which is to be represented by any pulse train in storing the predetermined dialing number or the predetermined message. In storing the predetermined dialing number or the predetermined message, the contact between the unnecessary conductive elements and their adjacent circular track is broken in order to remove these elements from each pulse train. When contact between a conductive element and an adjacent circular track is broken, such a conductive element is no longer considered to be "along a circular track" as this expression is used herein. By this method, the rotatable disc may be mass-produced and yet individually programmed upon its installation to store the information which is unique to each installation.

A further feature of the present invention is the provision of an alarm receiver wherein there is individually displayed in response to the series of message pulse trains a graphic display of the transmitted message. The information contained in each pulse train of the message is furnished to a separate display unit such as a "Nixie" tube. A received series of message pulse trains is passed through a first signal converter and thence through a ring counter to provide a separate enabling pulse for each pulse train. This converted series of enabling pulses is used to sequentially open a plurality of digit gates, each of which is connected to a separate digit display unit and each of which digit gates receives the entire series of message pulse trains so that the first pulse train of the transmitted message is passed to a first digit display unit, a second pulse train is passed to a second digit display unit, etc.

The received series of message pulse trains is also passed through a second signal converter which supplies a single reset pulse having a duration equal to that of the entire series of message pulse trains. At the beginning of this reset pulse, the ring counter and all of the digit display units are reset to be in condition to receive a newly transmitted message.

A still further feature of the present invention is the provision of an automatic answering switch in the alarm receiver, which answering switch in response to the current in the ringing signal from the central telephone exchange switches the telephone lines from an "on hook" position into connection with the receiver.

Still another feature of the present invention is the provision of an audio amplifier and a speaker in combination with the alarm system receiver circuit for providing an audio-alerting indication that a transmitted message is being received and graphically displayed.

An additional feature of the present invention is the provision of a return-tone timer circuit which is coupled to a return-tone generator for providing a return signal of a predetermined duration back over the telephone lines to the message transmitter location. The return-tone timer is further coupled to the input amplifier for suppressing the input amplifier from providing a false signal to the display units; and to the answering switch for causing the telephone lines to be returned to the "on hook" condition following the transmission of the return signal.

DESCRIPTION OF THE PREFERRED EMBODIMENT

Figure 1:
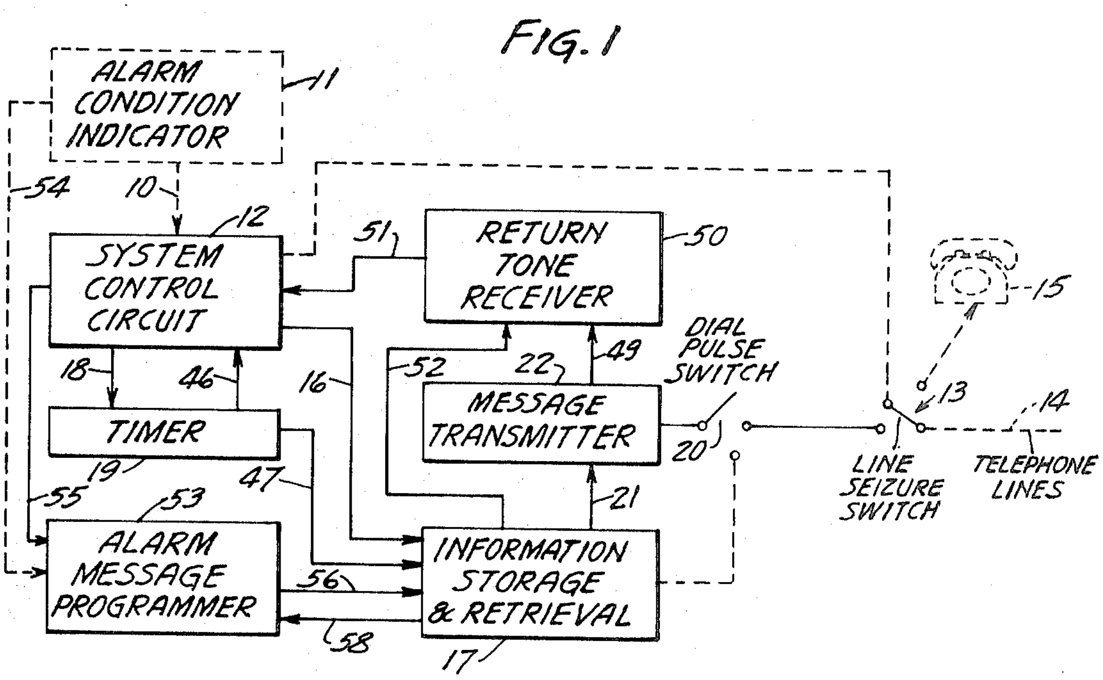
FIG. 1 is a block diagram of the dialing and message-transmission portions of the alarm system of the present invention.

Referring to FIG. 1, when a signal 10 which indicates an alarm condition is received from the alarm condition indicator 11 by the system control circuit 12, the system control circuit 12 functions to operate the line seizure switch 13 to disconnect the telephone lines 14 from a telephone 15 and to connect the telephone lines 14 to the alarm system. The system control circuit 12 further sends a signal on the line 16 to the information storage and retrieval unit 17 in order to actuate the latter, and simultaneously therewith also sends a signal on the line 18 to the timer 19. Upon being actuated, the information storage and retrieval unit 17 first functions to operate the dial pulse switch 20 to place a stored predetermined dialing number on the telephone lines 14. Thereafter, the information storage and retrieval unit 17 furnishes on the line 21 to the message transmitter 22 a stored predetermined message to be transmitted by the message transmitter 22 over the telephone lines 14.

Figures 2, 3A, 3B:
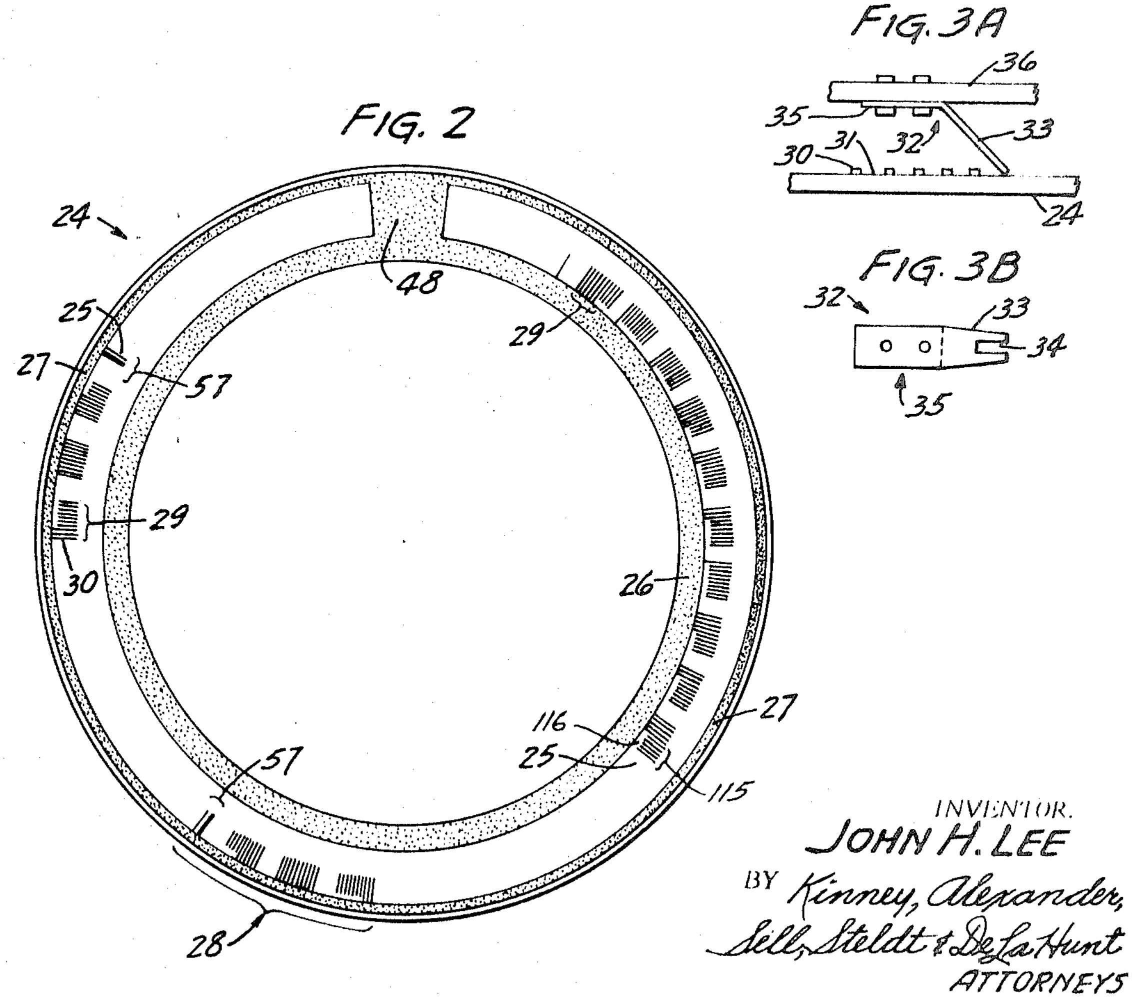
FIG. 2 is a top view of a rotatable disc used in the information storage and retrieval unit of FIG. 1 and is drawn approximately to 1:1 scale.
FIG. 3A is a front view of a conductive wiper in contact with the rotatable disc shown in FIG. 2.
FIG. 3B is a top view of the conductive wiper shown in FIG. 3A.

The predetermined dialing number and the predetermined message are stored on a rotatable disc 24 such as that shown in FIG. 2 by means of conductive elements 25 located long the separate circular conductive tracks 26 and 27 on one surface of the disc 24. These conductive elements 25, located along each circular track 26 and 27, define a series of pulse trains 28 wherein each pulse train 29 contains a number of pulse elements 30 (FIG. 3A) representative of a separate digit or character. The rotatable disc 24 is a dielectric board which has a thickness of not more than approximately 2 oz. of copper per square foot (approximately 0.61 Kg. per square meter) to define the predetermined pattern of conductive elements 25. The conductive pulse elements 30 are approximately 0.0125 inch (approximately 0.32 millimeter) in width and the nonconductive area 31 between the conductive pulse element is approximately 0.0125 inch (approximately 0.32 millimeter) wide. The relation of the width of the conductive pulse elements 30, the width of the spaces 31 therebetween, and the thickness of the conductive wiper blade 33, are such as to assure that the duration of the pulses is approximately equal to the duration between the pulses.

The conductive wipers 32 which are constructed as shown in FIGS. 3A and 3B each have a straight blade 33 constructed of approximately 0.007 inch (approximately 0.18 millimeter) thick gold-plated phosphorous bronze which extends at an angle of approximately 45° to the rotatable disc. The length of the extended portion of the blade is approximately 0.437 inch (approximately 11.1 millimeters). The width of the blade at its end where it contacts the disc is approximately 0.125 inch (approximatehy 3.2 millimeters). The depth of the mouth 34 in this end of the blade is approximately 0.187 inch (approximately 4.7 millimeters) with the width of the mouth being approximately 0.02 inch (approximately 0.5 millimeters). The length of that portion 35 of the wiper 32 which is connected to the stationary support 36 is approximately 0.375 inch (approximately 9.5 millimeters).

In the preferred embodiment, three conductive wipers 32 are used to make contact with the printed circuit board. A first conductive wiper such as the wiper 32 continuously makes contact with the conductive element 25 along the first circular track 26 which define a predetermined dialing number. A second conductive wiper also such as the wiper 32 is positioned to make contact with the conductive elements 25 along the second circular track 27 which define a predetermined message. A third conductive wiper continuously makes contact with the first circular track 26 which is electrically common to all of the conductive elements 25 on the rotatable disc which are along a circular track 26 or 27.

In the embodiment shown in FIG. 2, reading clockwise, the predetermined dialing number stored along the first rack 26 is 1–612–733–1535. The first pulse train contains only one digit and is used only when it is necessary to dial long distance to reach the receiver at a remote location. The next three pulse trains representing the 6, 1, and 2 digits, respectively, which are representative of the area code 612, will also be used only when it is necessary to dial long distance. The next seven pulse trains each contain the number of pulses representative of separate digits of a predetermined dialing number, in this case 733–1535. Again reading clockwise, the predetermined message stored along the second track 27 is 306–2. The first three pulse trains containing pulses representing the digits 306 identifies the particular information storage and retrieval unit and thereby indicates the location of the alarm condition. The last pulse train having two pulses represents the type of alarm condition. Two pulses represent a fire and one pulse represents a burglary. As will be hereinafter explained, the transmission of the second pulse of this pulse train is inhibited when a burglary and not a fire is sensed.

It is readily seen that when the first conductive wiper makes contact with a conductive element 25 along the first circular track 26, a circuit is completed between the leads (not shown) which are connected to the first conductive wiper and to the third conductive wiper, which third conductive wiper remains continuously in contact with the first circular track 26 and thereby in contact with all of the conductive elements 25 on the rotatable disc 24. The utilization of this combination of conductive wipers 32 and the rotatable disc 24 will be further described in connection with the description of the information storage and retrieval unit 17 hereinafter.

Figure 4:
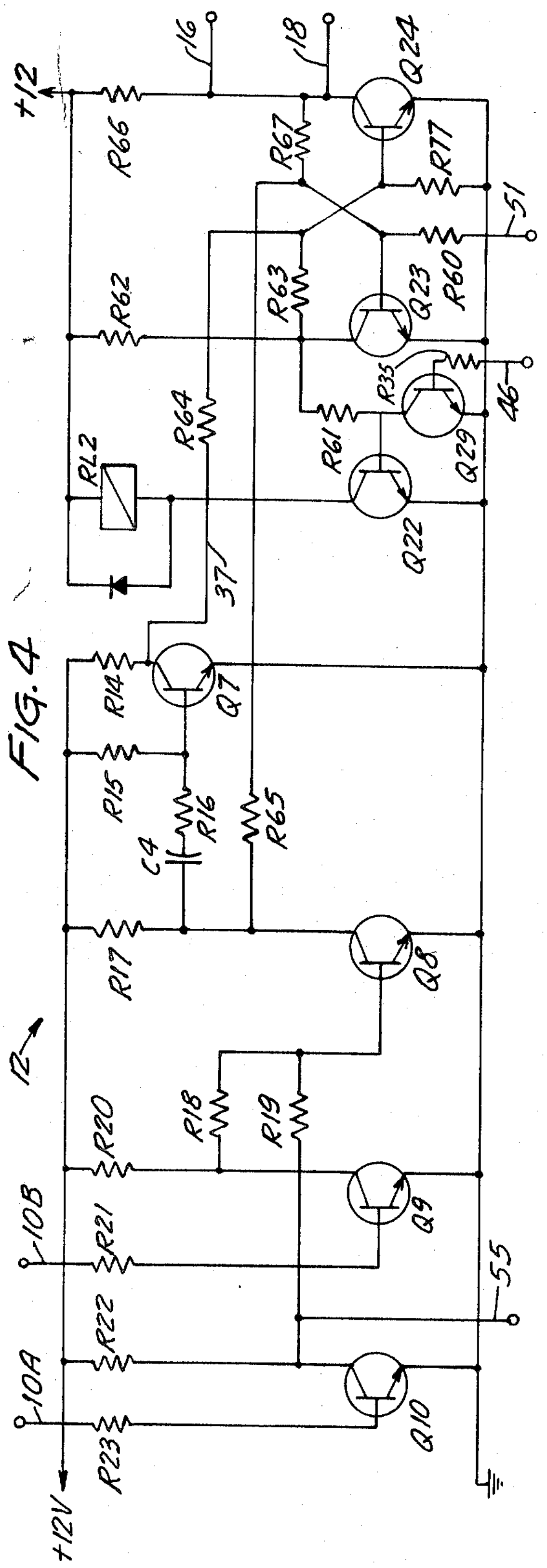
FIG. 4 is a schematic diagram of the system control circuit shown in FIG. 1.

Referring to the system control circuit 12 shown in FIG. 4, when an alarm condition is received on either the input line 10A or the input line 10B, in the form of a grounded signal, a momentary positive voltage pulse is transmitted on the line 37 from the collector of a transistor Q7 to the base of a bistable circuit transistor Q24. Upon receipt of this momentary pulse, the transistor Q24 is rendered conductive and the bistable circuit changes from its first condition to its second condition, thereby transmitting a grounded signal on the lead 16 to the information storage and retrieval unit 17 in order to actuate the latter. Upon the transistor Q24 being rendered conductive, the other transistor Q23 of the bistable circuit is rendered nonconductive which in turn causes the transistor Q22 to be rendered conductive. This enables current flow through the relay coil RL2, which current flow in turn operates the line seizure switch 13 to disconnect the telephone lines 14 from a telephone 15 and to connect the telephone lines 14 to the alarm system.

At such time as there is no longer a grounded signal on either input line 10A or 10B, transistor Q8 is rendered nonconductive and a continuous reset signal is furnished to the base of transistor Q23 to return the bistable circuit to its first condition.

Figure 5:
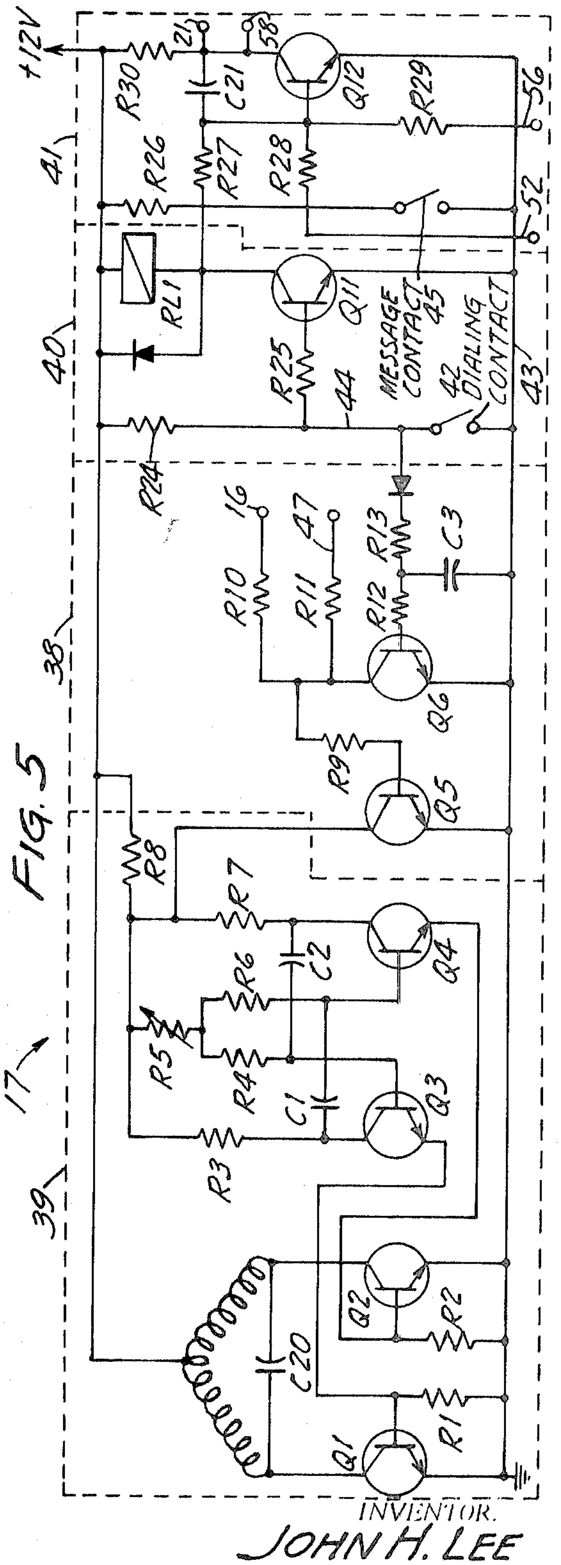
FIG. 5 is a schematic diagram of the electrical circuit portion of the information storage and retrieval unit shown in FIG. 1.

The electrical circuit portion of the information storage and retrieval unit 17 is shown in FIG. 5. In addition to the rotatable disc 24 this unit 17 contains a motor control circuit 38 and a motor converter 39 for rotating the rotatable disc 24. The motor (not shown) is a 3 watt, 60 Hz., 1 r.p.m. Ingraham Industrial Model 80, 12 volt AC motor with bifilar coils. A dial contact switch section 40 and a message contact switch section 41 are also included. Upon receipt of the grounded signal from the system control circuit on the line 16, the transistor Q5 is turned off thereby turning on the motor converter 39 and causing the rotatable disc 24 to rotate.

Referring to the dial contact switch section 40, the first conductive wiper is the dialing contact 42. The third conductive wiper and all of the conductive elements on the rotatable disc are at the potential of the grounded common line 43. Thus, when the first conductive wiper contacts a conductive element in the first circular track 26, the dialing contact 42 closes to complete a circuit between the line 44 and the common line 43. Each time the dialing contact 42 closes, the transistor Q11 is rendered nonconductive and relay coil RL1 is deenergized, thereby operating the dial pulse switch 20. Thus, as the rotatable disc 24 rotates, the dial pulse switch 20 operates to place a predetermined dialing number on the telephone lines 14. The disc 24 is rotated at the rate of 1 revolution per minute.

The second conductive wiper is the message contact 45 in the message contact switch section 41. Each time the second conductive wiper contacts a conductive element 25 along the second circular track 27, the message contact 45 closes. A pulsed message signal is thereby produced on the output line 21 in accordance with the opening and closing of the message contact 45. The capacitor C21 filters out the high-frequency noise which results from the wiper 32 making and breaking contact with conductive elements 30.

Figure 6:
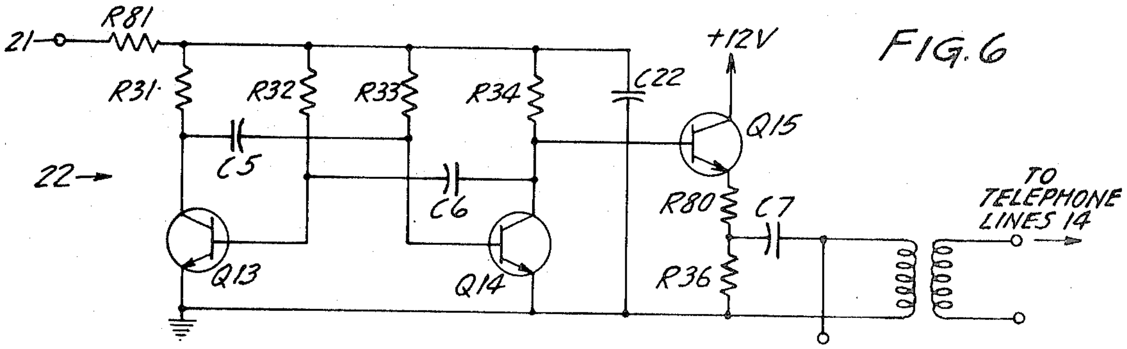
FIG. 6 is a schematic diagram of the message transmitter shown in FIG. 1.

The message transmitter 22, shown in FIG. 6, receives the predetermined message from the information storage and retrieval unit on the line 21. The message transmitter then places on the telephone lines 14 an approximately 800 Hz. signal which is modulated on the predetermined pulsed message received on the line 21.

Figure 7:
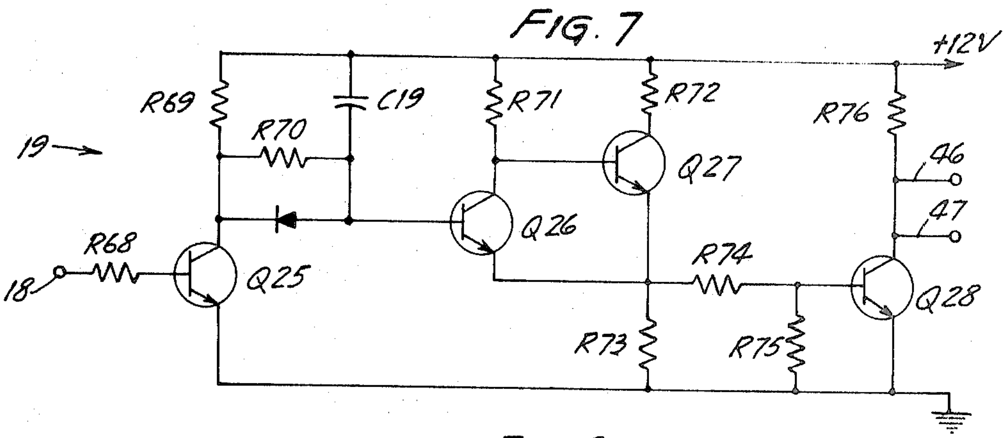
FIG. 7 is a schematic diagram of the timer shown in FIG. 1.

In another preferred embodiment, the timer 19 shown in FIG. 7 is included in the alarm system. The timer 19 commences operation in response to a signal received on the line 18 from the system control circuit 12. This signal is produced simultaneously with the signal on line 16 to the information storage and retrieval unit 17 so that the timer 19 commences operation simultaneously with the actuation of the information storage and retrieval unit 17. During operation of the timer 19, the capacitor C19 discharges for a prescribed period of time in accordance with its value and that of the resistors R69 and R70 until the transistor Q26 is turned on and the timer produces a positive voltage signal on the lines 46 and 47. The signal produced by the timer on the line 46 is returned to the system control circuit in order to return the bistable circuit thereof to its first condition. The signal produced on line 46 by the timer also turns off transistor Q22 thereby terminating current flow through the relay coil RL2; which in turn causes the line seizure switch 13 to operate to disconnect the telephone lines 14 from the alarm system and to return the telephone lines 14 to the telephone. The timer output signal produced on the line 47 is provided to the information storage and retrieval unit 17 to indicate thereto that the prescribed time has expired. At this instant the motor may still be running and the rotatable disc 24 still rotating. Since it is desired not to terminate the rotation of the rotatable disc 24 until such time as the disc 24 is in position for the beginning of a new dialing operation, the motor continues to operate even though the information storage and retrieval unit 17 has been enabled to be turned off by the signal received on line 47 from the timer 19. In order to assure that the rotatable disc 24 stops with the first conductive wiper in position to begin scanning the conductive elements 25 in the first circular track 26 and the second conductive wiper is in position wherein it has completed scanning the conductive elements 25 along the second circular track 27, a conductive end-of-message indicator element 48 is provided on the rotatable disc 24. The first conductive wiper, which is the dialing contact 42, is disposed to also make contact with the end-of-message indicator 48 on the rotatable disc 24. Referring to FIG. 5, the dialing contact 42 will then close for a sufficiently long duration in order for capacitor C3 in the motor control circuit 38 to be discharged, thereby turning off the transistor Q6. If a positive-going signal has also been received on the line 47 from the timer, or on line 16 from the system control circuit, the transistor Q5 is rendered conductive, which in turn turns off the motor and terminates the rotation of the rotatable disc 24.

Figure 8:
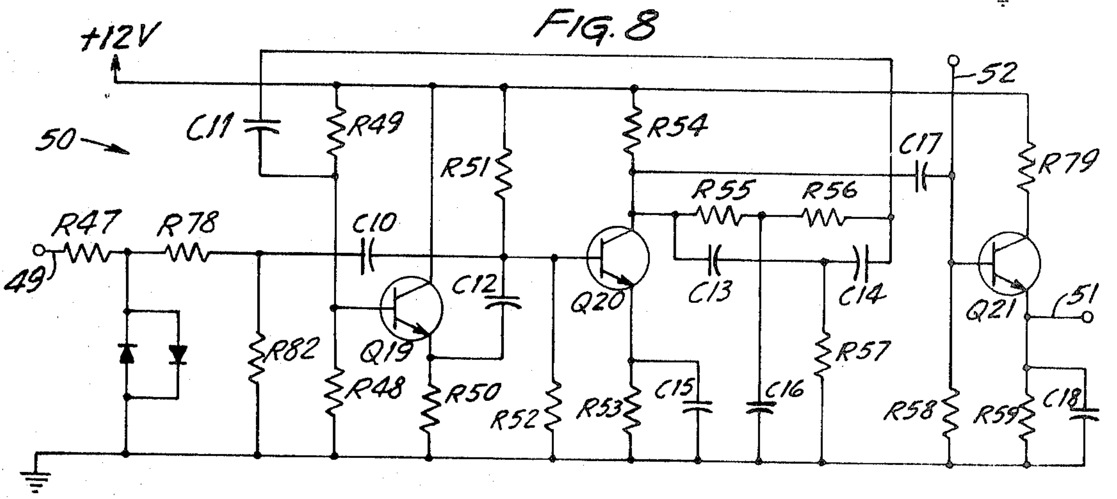
FIG. 8 is a schematic diagram of the return-tone receiver shown in FIG. 1.

In another preferred embodiment, the operation of the alarm system may be terminated by a return signal returned over the telephone lines 14 from the remote location. The present alarm system is adapted to receive an acknowledgment signal in the form of a return tone having a frequency of about 3,000 Hz., which is taken from the telephone lines 14 by the message transmitter 22 and delivered on a line 49 to a return-tone receiver 50. The return-tone receiver shown in FIG. 8, upon receipt of a return tone, delivers a signal on the line 51 to the system control circuit which causes the bistable circuit thereof to return to its first condition. When this bistable circuit returns to its first condition, the signal delivered on the line 16 by the system control circuit 12 to the information storage and retrieval unit 17 becomes a positive-going signal thereby enabling the motor of the information storage and retrieval unit 17 to be turned off when the first conductive wiper makes contact with the end-of-message indicator 48.

While a signal is being furnished from the message contact switch section 41 to the message transmitter 22, a signal is delivered on the line 52 to the return-tone receiver 50 to suppress the operation of the latter.

In still another preferred embodiment, an alarm message programmer 53 is included in the alarm system of the invention. While the alarm message programmer shown in FIGS. 1 and 9 may be entirely independent of the system control circuit 12 and responsive directly to a signal from an alarm condition indicator, as indicated in FIG. 1 by dashed line 54, in this embodiment it receives its alarm indication by way of the system control circuit 12 as indicated in FIG. 1 by the dashed line 10 and the solid line 55 in FIG. 1.

Referring to FIG. 4, indications of alarm conditions may be received by the system control circuit 12 on either lines 10A or 10B. The two different input lines 10A and 10B are for receiving indications of two different types of alarm conditions, such as a receipt of an indication of a fire on the line 10A and a receipt of an indication of an intrusion or burglary on the line 10B.

When an alarm condition indication is received on the line 10A thereby indicating a fire, a positive-going signal is furnished on line 55 to the alarm system programmer circuit 53. At all other times, the line 55 is grounded.

Figure 9:
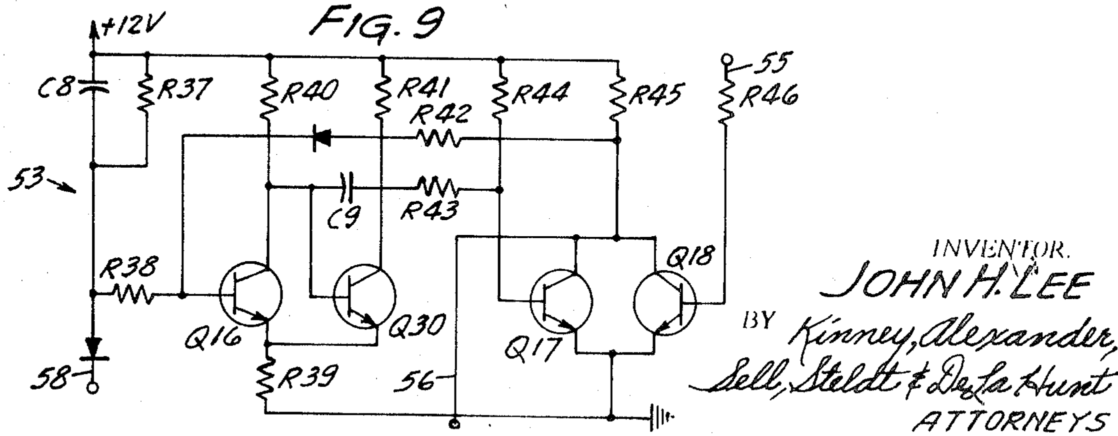
FIG. 9 is a schematic diagram of the alarm message programmer shown in FIG. 1.

Referring to FIG. 9, it is seen that a positive-going signal (indicating a fire) delivered on line 55 to alarm program circuit renders transistor Q18 conductive and causes a grounded signal to be furnished on the output line 56 to the information storage and retrieval unit 17.

It is noted that on the rotatable disc in the pulse train 57 of the stored predetermined message there are two conductive elements, the first, which is scanned while reading clockwise, being considerably wider than the second, thereby provides a pulse of a longer duration on the output line 58. This digit of the stored predetermined message indicates a burglary if one pulse is delivered to the message transmitter 22 and a fire if two pulses are delivered thereto. The alarm message programmer 53 includes a suppressor circuit which in response to a sufficiently long duration output signal on line 58 from the message contact switch section 41 of the information storage and retrieval unit 17 provides a positive-going signal on line 56 to the message contact switch section 41 to suppress the furnishing of the next scanned pulse from the rotatable disc 24 to the message transmitter 22. However, if the signal received on the input line 55 of the alarm message program circuit 53 is positive, thereby indicating a fire, transistor Q18 is rendered conductive thereby grounding line 56 and preventing the suppressing positive signal from being delivered on the line 56 to the message contact switch section even though the message contact 45 scans the wider conductive element of the pulse train 57. Thus, whenever a fire is indicated on input line 10A, two pulses will be delivered from the message contact switch section 41 to the message transmitter 22, notwithstanding whether a burglary condition is also indicated on the input line 10B.

ALARM RECEIVER

Figure 10:
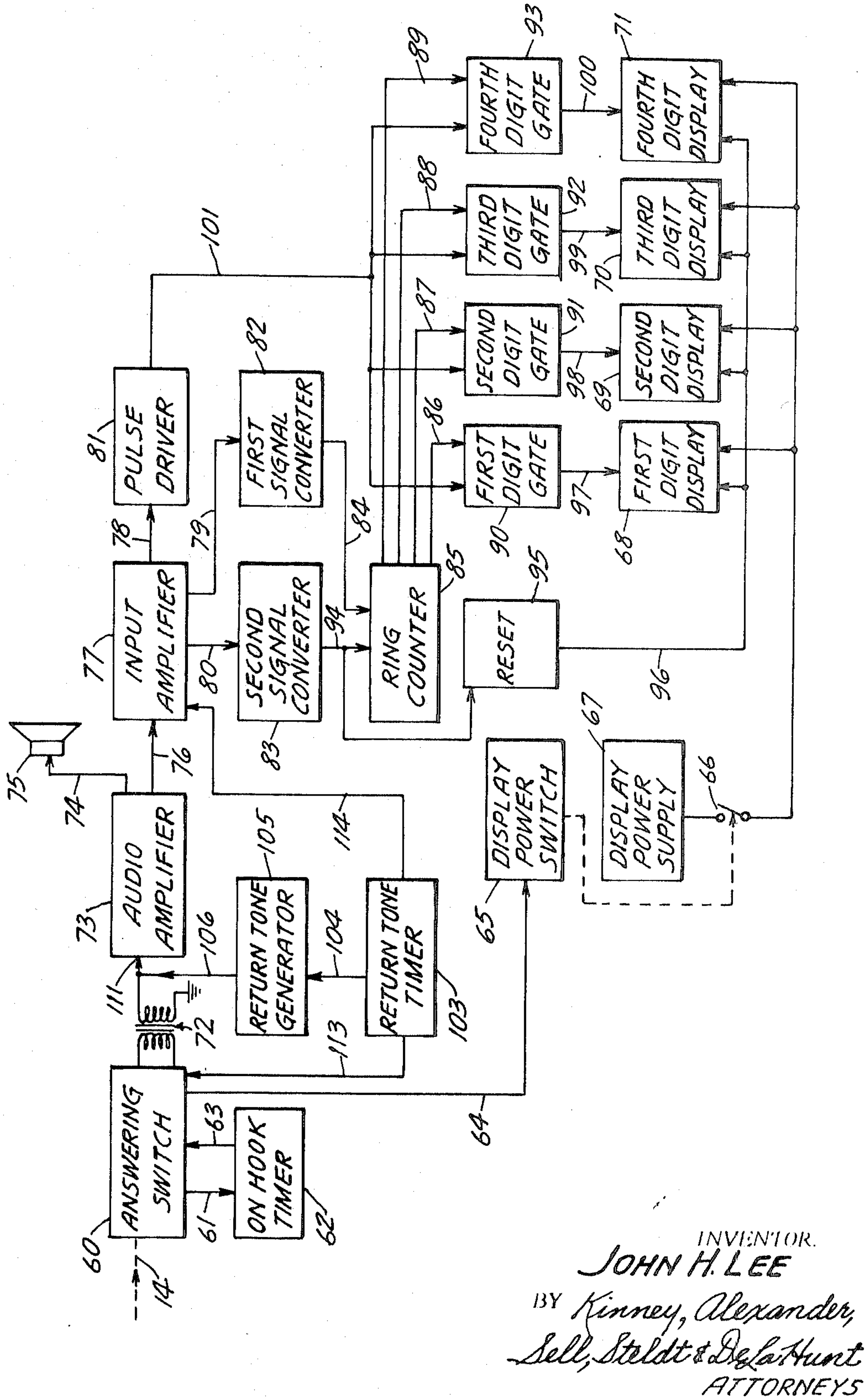
FIG. 10 is a block diagram of the alarm receiver which is capable of receiving messages transmitted by the message transmitter of FIG. 1.
Figure 11:
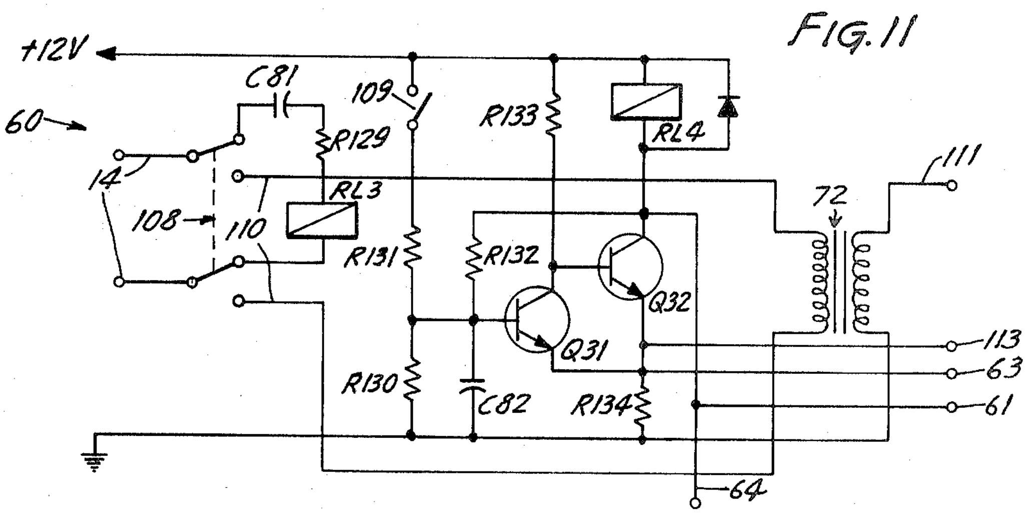
FIG. 11 is a schematic diagram of the answering switch in FIG. 10.
Figure 19:
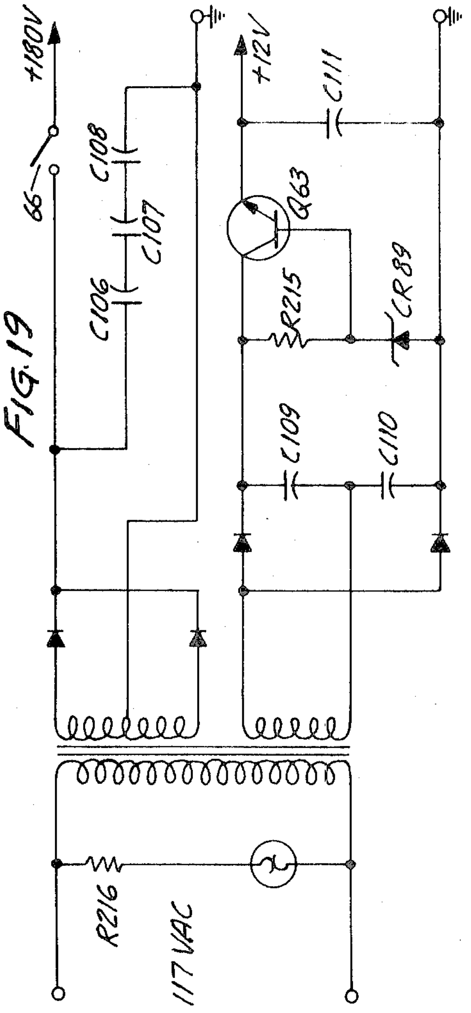
FIG. 19 is a schematic diagram of the receiver power supply shown in FIG. 10.

In another embodiment, the dialing and message-transmitting portion of the alarm system of the present invention is further combined with an alarm receiver. The alarm receiver is functionally illustrated in block form in FIG. 10, and schematically illustrated in FIGS. 11–20. The alarm receiver is connected to the telephone line 14 by an answering switch 60 (FIG. 11). The answering switch 60 responds to the ringing pulses delivered from the central telephone exchange upon the dialing of the telephone number of the remote location in order to connect the remainder of the alarm receiver (FIG. 10) to the telephone lines 14. Upon the answering switch 60 so connecting the remainder of the alarm receiver to the telephone lines, a signal is furnished on the line 61 to an on-hook timer 62 (FIG. 20) which in turn delivers a signal on line 63 back to the answering switch 60 after a prescribed duration. This signal on line 63 to the answering switch 60 causes the answering switch 60 to disconnect the alarm receiver from the telephone lines 14. Upon connecting the alarm receiver to the telephone lines 14, the answering switch 60 also provides a signal on line 64 to a display power switch 65 (FIG. 18) which operates a switch 66 to a display power supply 67 (FIG. 19) so as to provide 180 volt DC power for the display units 68–71 of the alarm receiver and 12 volt DC power for the remainder of the alarm receiver.

Figure 12:
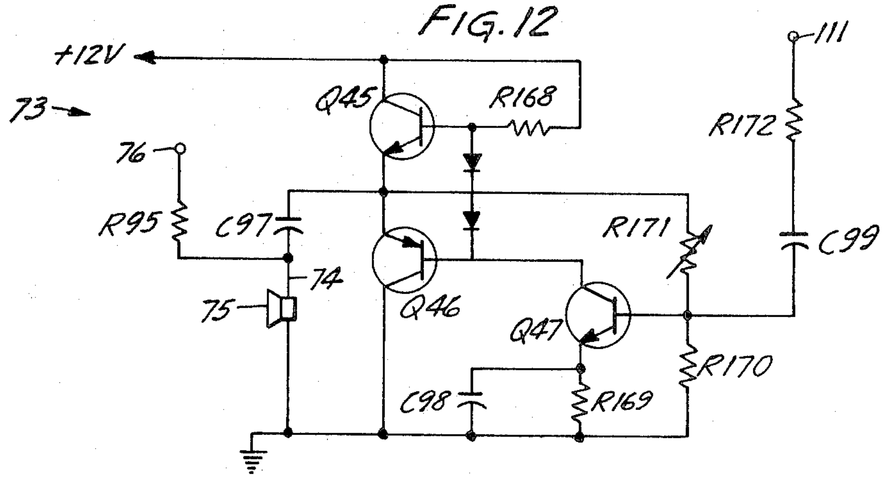
FIG. 12 is a schematic diagram of the audio amplifier and speaker shown in FIG. 10.
Figure 13:
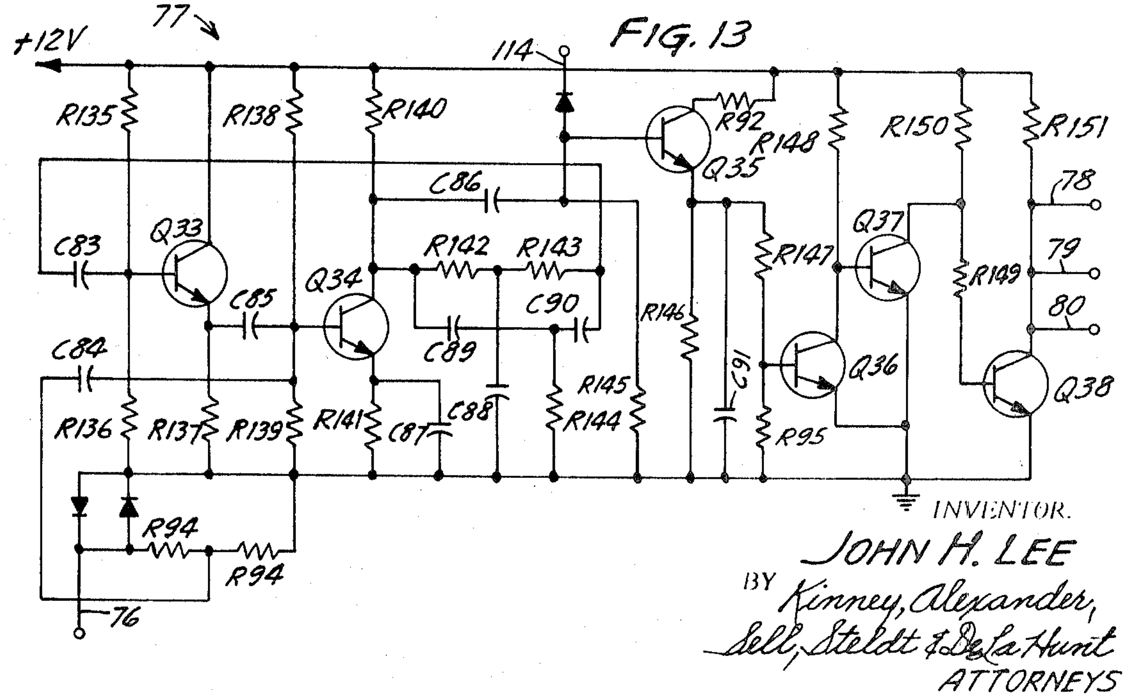
FIG. 13 is a schematic diagram of the input amplifier shown in FIG. 10.
Figure 14:
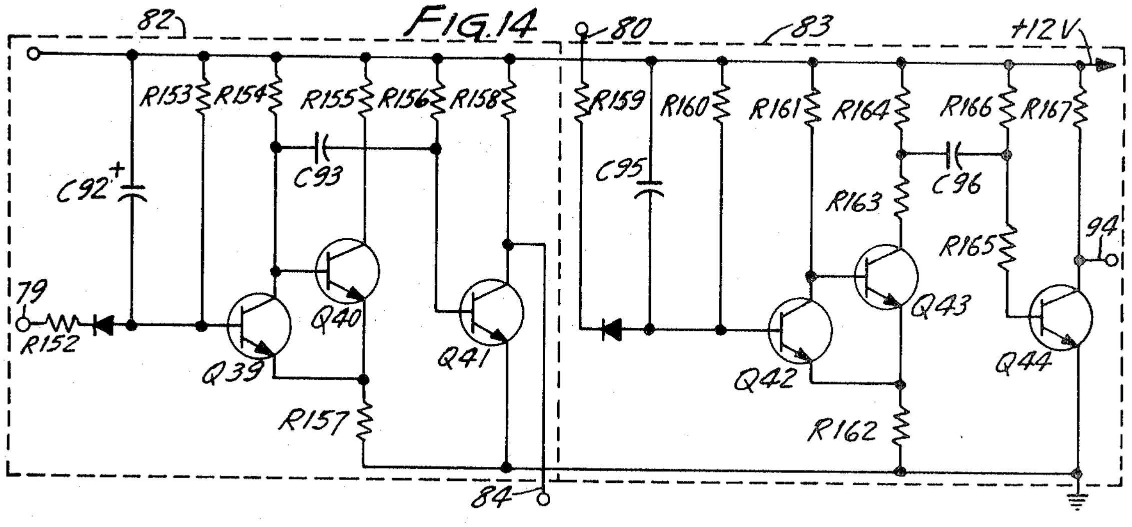
FIG. 14 is a schematic diagram of the first and second signal converters shown in FIG. 10.
Figure 15:
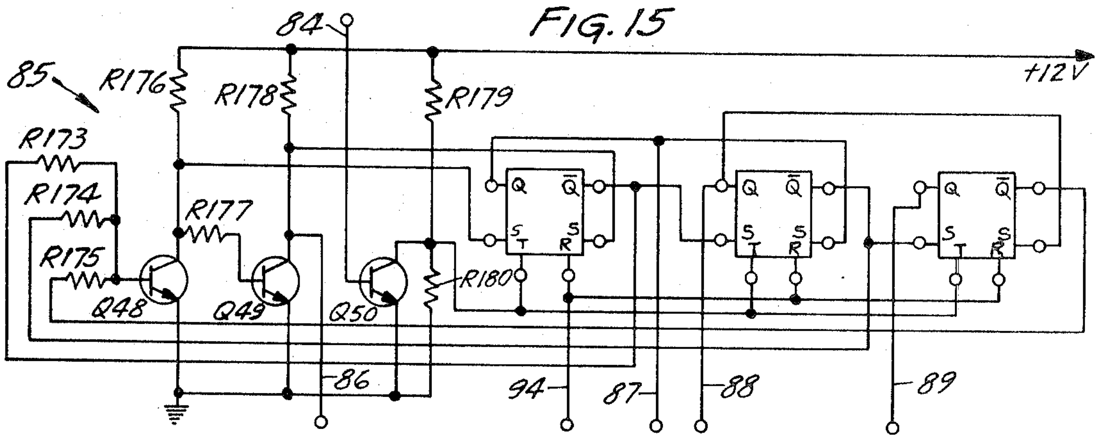
FIG. 15 is a schematic diagram of the ring counter shown in FIG. 10.
Figure 16:
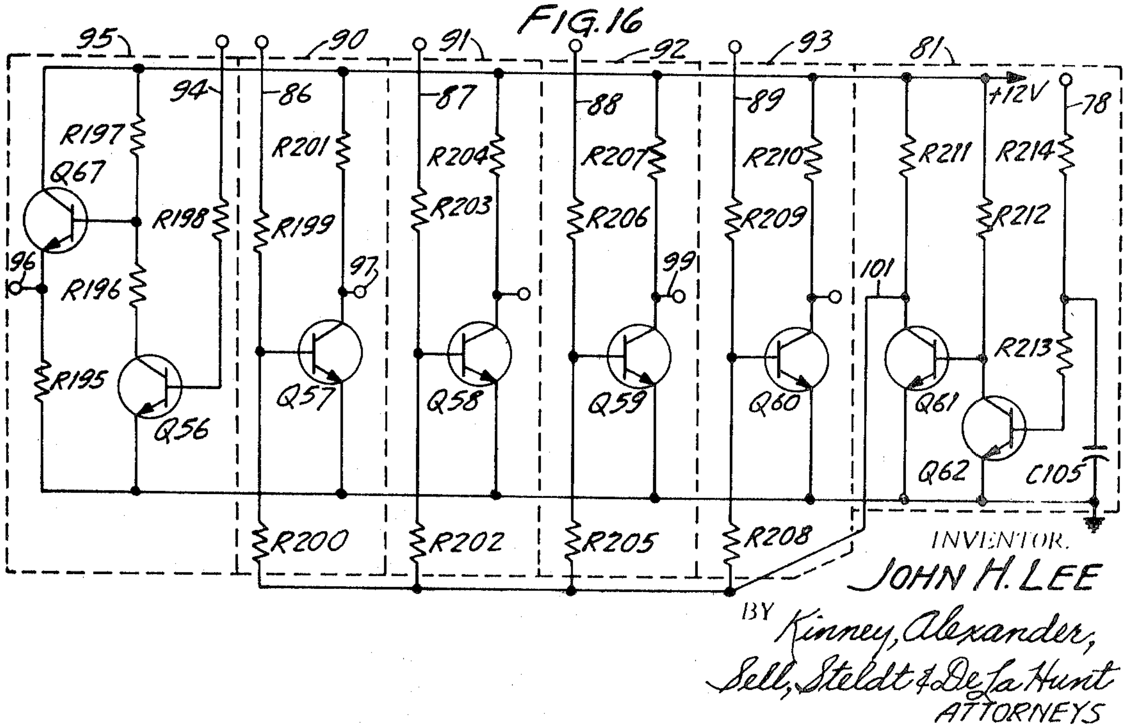
FIG. 16 is a schematic diagram of the reset circuit, of the first, second, third and fourth digit gates, and of the pulse driver circuit, all of which are shown in FIG. 10.

Once the telephone lines 14 have been connected to the alarm receiver, the transmitted message from the message transmitter 22 may be delivered through the transformer 72 to an audio amplifier 73 (FIG. 12). Upon receipt of the transmitted message, the audio amplifier 73 transmits a signal on the line 74 to a speaker 75 which causes an audio-alerting signal at the remote location that a transmitted message indicating an alarm condition is being received so that an attendant at the remote location might observe the transmitted message on the plurality of display units 68–71. See FIG. 17 for the schematic diagram of a display unit. The audio amplifier 73 also delivers a signal on line 76 to the input amplifier 77 (FIG. 13). The input amplifier 77 demodulates the 800 Hz. signal received on the line 76 from the audio amplifier 73 and provides on the lines 78, 79 and 80 to a pulse driver circuit 81 (FIG. 16) a first signal converter 82 and a second signal converter 83 (both in FIG. 14), respectively, a DC signal which is a series of message pulse trains representing the stored predetermined message provided from the information storage and retrieval unit 17. The first signal converter 82 provides on the line 84 to a ring counter 85 (Figure 15) a separate pulse for each pulse train received from the input amplifier 77, which separate pulse has a duration equal to the duration of the corresponding pulse train. The ring counter 85 sequentially provides on lines 86–89 to digit display gates 90–93 (FIG. 16) an enabling pulse for each pulse received from the first signal converter 82. The second signal converter 83 provides on the line 94 to the ring counter 85 and to a reset circuit 95 (FIG. 16) a single pulse having the duration of an entire series of message pulse trains. Reset circuit 95 is connected by line 96 to each of the display units 68–71. The leading edge of this pulse when provided on the line 94 causes the ring counter 85 and each of the display units 68–71 to be reset to an initial position for receipt of the transmitted message.

The display units 68–71 in the preferred embodiment include "Nixie" tubes, which tubes include separate filaments which are illuminated in sequence in accordance with the number of pulses received. The digit display units 68–71 each receive their input signals from the separate digit gates 90–93 respectively on lines 97–100. Each digit gate 90–93 receives on the line 101 from the pulse driver a shaped signal containing all of the pulses in the transmitted message. However, each digit gate 90–93 is enabled only in response to an enabling signal received on separate output lines 86–89 from the ring 86–85. The ring counter 85 is responsive to the signal received from the first signal converter 82 and therefore provides enabling signals on the line 86 to the first digit gate 90 only during the duration of the first pulse train received from the first signal converter 82, which corresponds to the first pulse train being delivered by the pulse driver 81. Therefore, during the delivery of the first pulse train from the pulse driver 81, the first digit gate 90 is enabled and the first pulse train is transmitted to only the first digit display unit 68. In a "Nixie" tube containing filaments for display of characters 1, 2, 3...9, and 0 in sequence, in response to a pulse train containing 1, 2, 3...9, and 10 pulses respectively, a three-pulse train would result in the number 3 being displayed in the first digit display unit 68. For the message transmitted in accordance with the predetermined message stored on the rotatable disc 24 of the information storage and retrieval unit 17, a number 306 would be displayed on the first, second and third display units respectively and for an indicated alarm condition of a fire, a numeral 2 or a filament shaped in the letter "F" would be illuminated in the "Nixie" tube of the fourth display unit 71. The digit display units 68–71 are connected by line 102 to the display power supply 67.

A return signal acknowledging receipt of the transmitted message may be initiated by an attendant at the remote location. The return signal is so transmitted back to the location of the message transmitter 22 by turning on the return tone timer 103 which delivers a signal on line 104 to the return tone generator 105 which delivers a signal on the line 106 for return over the telephone lines 14 back to the message transmitter 22 and sequentially to the return tone receiver 50 as described hereinbefore. The return tone timer is turned on by closing pushbutton switch 107. Certain portions of the alarm receiver will now be described in greater detail. Referring to FIG. 11, before the answering switch 60 receives a ringing signal from the central telephone exchange, the line seizure switch 108 is in the position shown. This is the "on hook" position for the alarm receiver. When the predetermined dialing number for the alarm receiver is dialed and received by the central telephone exchange, the central telephone exchange transmits a ringing signal over the telephone lines 14 to the alarm receiver. This ringing signal operates the relay RL3 to open and close the switch 109 to charge the capacitor C82 sufficiently to turn on transistor Q31 which in turn turns off the transistor Q32 so as to operate the relay RL4 to operate switch 108 to transfer the telephone lines from the "on hook" position into connection with the alarm reciever. Signals then received over the telephone lines 14 are transmitted through the lines 110 for transmission through the transformer 72 on line 111 to the audio amplifier circuit.

Figure 20:
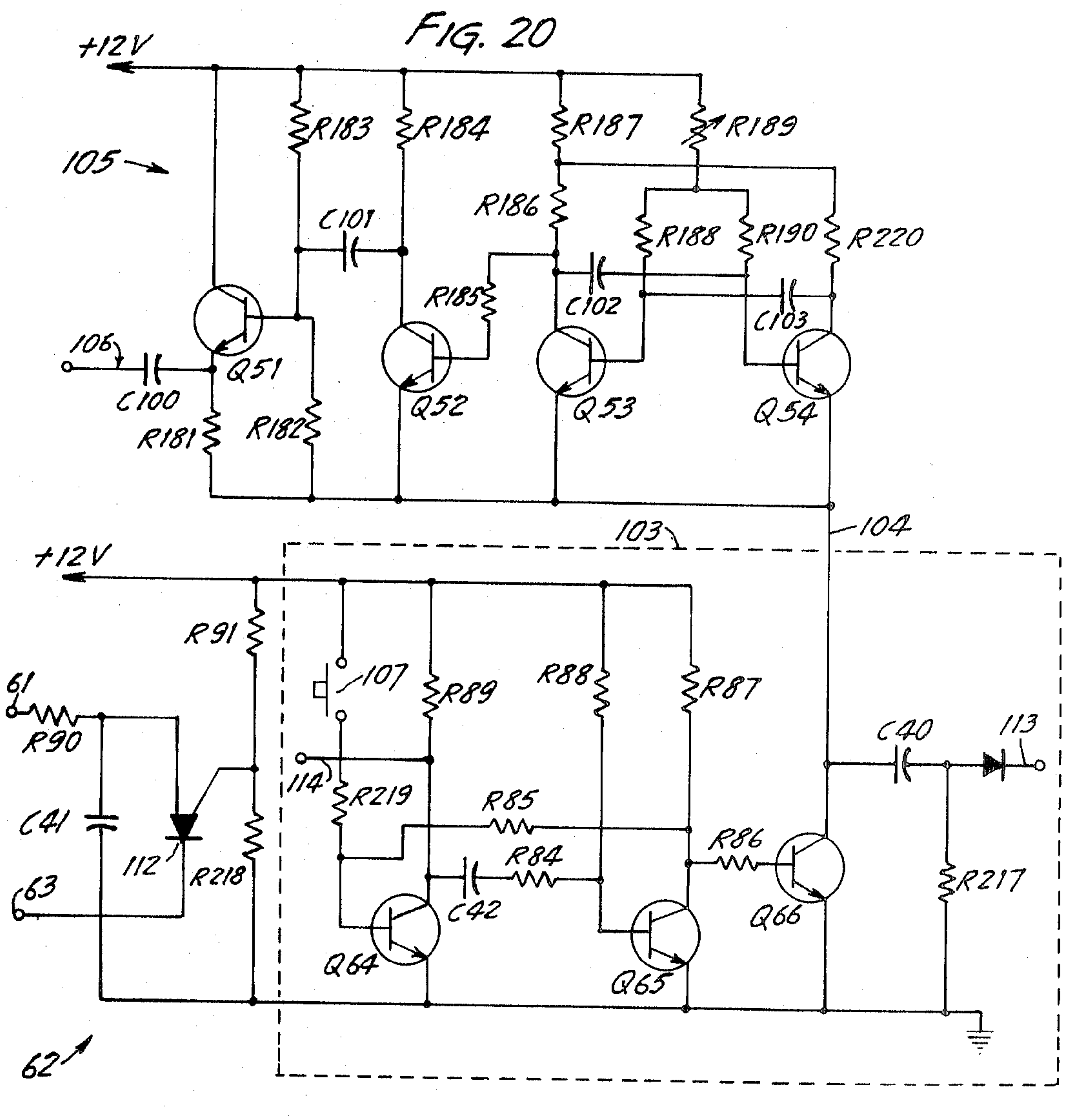
FIG. 20 is a schematic diagram of the return-tone generator, return-tone timer, and on-hook timer shown in FIG. 10.

Referring to FIG. 20, upon switching the telephone lines 14 from the "on hook" position into connection with the alarm receiver the answering switch 60 provides a signal on the line 61 to the "on hook" timer 62. However, after a sufficient charge is built up on the capacitor C41, the programmable unijunction transistor 112 turns on and a signal is delivered back to the answering switch on the line 63 to cause the answering switch 60 to operate to return the telephone lines 14 to the "on hook" position.

An acknowledgement that the predetermined message has been received can be initiated by an attendant at the alarm receiver by closing the pushbutton switch 107 in the return tone timer circuit. After the pushbutton switch 107 is closed, a signal having a predetermined duration is furnished on the line 104 to the return tone generator 105 which then furnishes for this predetermined duration an approximately 3,000 Hz. return tone signal on the line 106 for transmission back over the telephone lines 14 to the message dialer and transmission portion of the alarm circuit. The return tone signal is accordingly received by the return tone receiver 50 as explained hereinabove. At the end of this predetermined duration a signal is furnished on the line 113 from the return tone timer circuit 103 to the answering switch 60 to cause the answering switch 60 to operate to return the telephone lines 14 to the "on hook" position. During this predetermined duration a signal is also provided from the return tone timer circuit 103 on line 14 to the input amplifier 77 to suppress the operation of the input amplifier during the interval while the return signal is being provided on line 106 from the return tone generator 105. This suppression prevents a false signal from being provided from the input amplifier 77 to the display units 68–71.

The alarm receiver of the present invention is, of course, useful for providing a graphic display from a series of message pulse trains which originate from other types of sources and its utility is not dependent upon its being combined with an information storage and retrieval unit such as that described herein.

Figure 17:
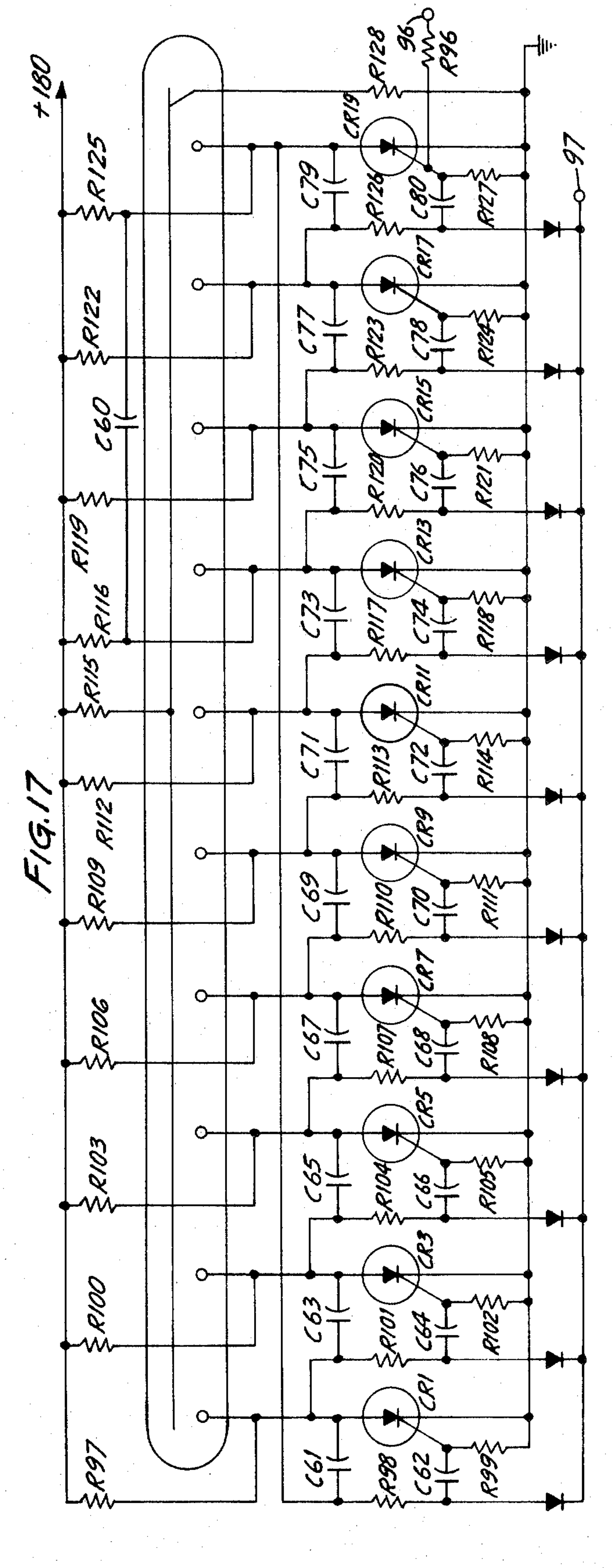
FIG. 17 is a schematic diagram of one of the digit display units shown in FIG. 10, all of which units are identical.
Figure 18:
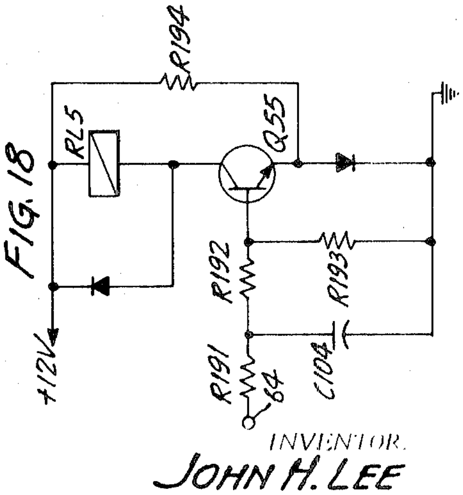
FIG. 18 is a schematic diagram of the display power switch shown in FIG. 10.

A preferred embodiment of the present invention has been constructed. Voltage bias values used in this embodiment are indicated on the various schematic diagrams shown in the figures of the drawing. Except for NPN-transistors Q1 and Q2, which are both General Electric 2N–3414 transistors or their equivalents, and NPN-transistor Q63, which is a Motorola 2N–4921 transistor or its equivalent, all of the NPN-transistors shown in the drawings are General Electric 2N–3394 transistors or its equivalent. PNP-transistor Q46 is a General Electric 2N–5354 transistor. Programmable unijunction transistor 112 is a General Electric D13T1 or its equivalent. Zener diode C89 is a General Electric Z4XL12B or its equivalent. The SCR's shown in FIG. 17 are all Motorola TIC47 or its equivalent. Except for the diodes CB88 and CR 90, which are Motorola 1N4001's and the diodes CR 86 and CR 87 which are Motorola 1N4004's, all of the diodes shown in the drawings are GEneral Electric 1N914's or its equivalent. The values of resistors and capacitors used in this embodiment are set forth in the following table:

Resistors

| | | | |
|---|---|---|---|
| R1 | 10 KΩ | R92 | 1 KΩ |
| R2 | 10 KΩ | R93 | 1.8 KΩ |
| R3 | 3.3 KΩ | R94 | 680 KΩ |
| R4 | 56 KΩ | R95 | 2.2 KΩ |
| R5 | 15 KΩ | R96 | 5.6 KΩ |
| R6 | 56 KΩ | R97 | 120 KΩ |
| R7 | 3.3 KΩ | R98 | 33 KΩ |
| R8 | 3.3 KΩ | R99 | 1 KΩ |
| R9 | 33 KΩ | R100 | 120 KΩ |
| R10 | 33 KΩ | R101 | 33 KΩ |
| R11 | 33 KΩ | R102 | 1 KΩ |
| R12 | 12 KΩ | R103 | 120 KΩ |
| R13 | 12 KΩ | R104 | 33 KΩ |
| R14 | 12 KΩ | R105 | 1 KΩ |
| R15 | 68 KΩ | R106 | 120 KΩ |
| R16 | 33 KΩ | R107 | 33 KΩ |
| R17 | 12 KΩ | R108 | 1 KΩ |
| R18 | 68 KΩ | R109 | 120 KΩ |
| R19 | 68 KΩ | R110 | 33 KΩ |
| R20 | 12 KΩ | R111 | 1 KΩ |
| R21 | 33 KΩ | R112 | 120 KΩ |
| R22 | 12 KΩ | R113 | 33 KΩ |
| R23 | 33 KΩ | R114 | 1 KΩ |
| R24 | 12 KΩ | R115 | 15 KΩ |
| R25 | 12 KΩ | R116 | 120 KΩ |
| R26 | 12 KΩ | R117 | 33 KΩ |
| R27 | 33 KΩ | R118 | 1 KΩ |
| R28 | 33 KΩ | R119 | 120 KΩ |
| R29 | 33 KΩ | R120 | 33 KΩ |
| R30 | 2.2 KΩ | R121 | 1 KΩ |
| R31 | 3.9 KΩ | R122 | 120 KΩ |
| R32 | 68 KΩ | R123 | 33 KΩ |
| R33 | 68 KΩ | R124 | 1 KΩ |
| R34 | 3.9 KΩ | R125 | 120 KΩ |
| R35 | 68 KΩ | R126 | 33 KΩ |
| R36 | 3.9 KΩ | R127 | 1 KΩ |
| R37 | 1 M | R128 | 10 M |
| R38 | 68 KΩ | R129 | 4.7 KΩ |
| R39 | 3.9 KΩ | R130 | 47 KΩ |
| R40 | 68 KΩ | R131 | 4.7 KΩ |
| R41 | 6.8 KΩ | R132 | 47 KΩ |
| R42 | 68 KΩ | R133 | 3.9 KΩ |
| R43 | 6.8 KΩ | R134 | 39 KΩ |
| R44 | 68 KΩ | R135 | 100 KΩ |
| R45 | 3.3 KΩ | R136 | 100 KΩ |
| R46 | 68 KΩ | R137 | 10 KΩ |
| R47 | 1.5 KΩ | R138 | 56 KΩ |
| R48 | 100 KΩ | R139 | 10 KΩ |
| R49 | 100 KΩ | R150 | 4.7 KΩ |
| R50 | 10 KΩ | R141 | 1 KΩ |
| R51 | 56 KΩ | R142 | 10 KΩ |
| R52 | 10 KΩ | R143 | 10 KΩ |
| R53 | 1 KΩ | R144 | 5.6 KΩ |
| R54 | 4.7 KΩ | R145 | 10 KΩ |
| R55 | 10 KΩ | R146 | 2.2 KΩ |
| R56 | 10 KΩ | R147 | 1 KΩ |
| R57 | 5.6 KΩ | R148 | 22 KΩ |
| R58 | 12 KΩ | R149 | 47 KΩ |
| R59 | 27 KΩ | R150 | 12 KΩ |
| R60 | 27 KΩ | R151 | 4.7 KΩ |
| R61 | 6.8 KΩ | R152 | 1 KΩ |
| R62 | 5.6 KΩ | R153 | 330 KΩ |
| R63 | 68 KΩ | R154 | 33 KΩ |
| R64 | 68 KΩ | R155 | 12 KΩ |
| R65 | 68 KΩ | R156 | 100 KΩ |
| R66 | 12 KΩ | R157 | 10 KΩ |
| R67 | 68 KΩ | R158 | 12 KΩ |
| R68 | 68 KΩ | R159 | 1 KΩ |
| R69 | 12 KΩ | R160 | 1 M |
| R70 | 680 KΩ | R161 | 47 KΩ |
| R71 | 56 KΩ | R162 | 10 KΩ |
| R72 | 4.7 KΩ | R163 | 5.6 KΩ |
| R73 | 5.6 KΩ | R164 | 5.6 KΩ |
| R74 | 15 KΩ | R165 | 10 KΩ |
| R75 | 4.7 KΩ | R166 | 100 KΩ |
| R76 | 12 KΩ | R167 | 12 KΩ |
| R77 | 33 KΩ | R168 | 4.7 KΩ |
| R78 | 1.5 KΩ | R169 | 390Ω |
| R79 | 10 KΩ | R170 | 18 KΩ |
| R80 | 1 KΩ | R171 | 100 KΩ |
| R81 | 1.5 KΩ | R172 | 4.7 KΩ |
| R82 | 1 KΩ | R173 | 68 KΩ |
| | | R174 | 68 KΩ |
| R84 | 15 KΩ | R175 | 68 KΩ |
| R85 | 33 KΩ | R176 | 12 KΩ |
| R86 | 12 KΩ | R177 | 68 KΩ |
| R87 | 4.7 KΩ | R178 | 12 KΩ |
| R88 | 33 KΩ | R179 | 4.7 KΩ |
| R89 | 4.7 KΩ | R180 | 4.7 KΩ |
| R90 | 680 KΩ | R181 | 1 KΩ |
| R91 | 12 KΩ | R182 | 10 KΩ |

Resistors

| | | | |
|---|---|---|---|
| R183 | 10 KΩ | R202 | 68 KΩ |
| R184 | 12 KΩ | R203 | 68 KΩ |
| R185 | 68 KΩ | R204 | 4.7 KΩ |
| R186 | 3.9 KΩ | R205 | 68 KΩ |
| R187 | 3.9 KΩ | R206 | 68 KΩ |
| R188 | 82 KΩ | R207 | 4.7 KΩ |
| R189 | 10 KΩ | R208 | 68 KΩ |
| R190 | 82 KΩ | R209 | 68 KΩ |
| R191 | 10 KΩ | R210 | 4.7 KΩ |
| R192 | 6.7 KΩ | R211 | 4.7 KΩ |
| R193 | 10 KΩ | R212 | 12 KΩ |
| R194 | 12 KΩ | R213 | 33 KΩ |
| R195 | 5.6 KΩ | R214 | 33 KΩ |
| R196 | 12 KΩ | R215 | 330 KΩ |
| R197 | 1.5 KΩ | R216 | 120 KΩ |
| R198 | 47 KΩ | R217 | 10 KΩ |
| R199 | 68 KΩ | R218 | 12 KΩ |
| R200 | 68 KΩ | R219 | 33 KΩ |
| R201 | 4.7 KΩ | R220 | 3.9 KΩ |

Capacitors

| | | | |
|---|---|---|---|
| C1 | .2 μf. | C73 | .015 μf. |
| C2 | .2 μf. | C74 | .015 μf. |
| C3 | 10 μf. | C75 | .015 μf. |
| C4 | .1 μf. | C76 | .015 μf. |
| C5 | .01 μf. | C77 | .015 μf. |
| C6 | .01 μf. | C78 | .015 μf. |
| C7 | 10 μf. | C79 | .015 μf. |
| C8 | .2 μf. | C80 | .015 μf. |
| C9 | 10 μf. | C81 | .1 μf. |
| C10 | .2 μf. | C82 | 125 μf. |
| C11 | .05 μf. | C83 | .05 μf. |
| C12 | .05 μf. | C84 | 10 μf. |
| C13 | .005 μf. | C85 | .05 μf. |
| C14 | .005 μf. | C86 | .05 μf. |
| C15 | 10 μf. | C87 | 5 μf. |
| C16 | .01 μf. | C88 | .01 μf. |
| C17 | .05 μf. | C89 | .005 μf. |
| C18 | 125 μf. | C90 | .005 μf. |
| C19 | 400 μf. | C91 | 10 μf. |
| C20 | .22 μf. | C92 | 1 μf. |
| C21 | .1 μf. | C93 | .05 μf. |
| C22 | .22 μf. | C95 | 2 μf. |
| C40 | .1 μf. | C96 | .15 μf. |
| C41 | 50 μf. | C97 | 125 μf. |
| C42 | 125 μf. | C98 | 125 μf. |
| C60 | .015 μf. | C99 | .05 μf. |
| C61 | .015 μf. | C100 | .1 μf. |
| C62 | .015 μf. | C101 | .05 μf. |
| C63 | .015 μf. | C102 | .005 μf. |
| C64 | .015 μf. | C103 | .005 μf. |
| C65 | .015 μf. | C104 | 125 μf. |
| C66 | .015 μf. | C105 | .22 μf. |
| C67 | .015 μf. | C106 | 64 μf. |
| C68 | .015 μf. | C107 | 64 μf. |
| C69 | .015 μf. | C108 | 64 μf. |
| C70 | .015 μf. | C109 | 1,000 μf. |
| C71 | .015 μf. | C110 | 1,000 μf. |
| C72 | .015 μf. | C111 | 1,000 μf. |

MANUFACTURE OF ROTATABLE DISC

When manufacturing the rotatable disc 24 used with the alarm system of the present invention, each pulse train 29 is provided with 10 conductive pulse elements 25 since a 10 digit dialing number is used and also because each of the display units 68–71 have the capacity of providing 10 different displays. The first pulse train in the predetermined dialing number track need contain only one pulse, however, since "1" is commonly used to provide dialing access to the long distance lines. Upon installation of the alarm system of the present invention wherein the dialing number of the remote location is 1-612-733-1535, the unnecessary conductive elements 115 are removed from contact with the adjacent conductive circular track 26 by scratching away the conductive material at the juncture 116 between these conductive elements 115 and the conductive tracks 26 in order to break the conductive contact between these unnecessary elements and their adjacent circular track, so that the stored predetermined number is represented by a corresponding series of pulse trains. The contact between the excess conductive elements 115 and the second track 27 is similarly broken to provide an alarm system location number of 306. Two pulses are provided in the last pulse train 57 so that either a burglary or fire may in indicated to the alarm receiver. In another embodiment, the unnecessary conductive elements 115 are completely removed from the rotatable disc.

I claim:

1 An alarm system wherein in response to a sensed alarm condition a dialing pulse switch is operated to dial a predetermined dialing number on the telephone lines and a predetermined message is then transmitted over the telephone lines, comprising a dial pulse switch for dialing a predetermined number on the telephone lines;

a message transmitter for transmitting a predetermined message over the telephone lines;

an information storage and retrieval unit operatively coupled to the dial pulse switch and to the message transmitter and containing a stored predetermined dialing number and a stored predetermined message, which information storage and retrieval unit, in response to a said sensed alarm condition, operates the dial pulse switch to dial the stored predetermined dialing number and provides to the message transmitter a stored predetermined message for transmission, which information storage and retrieval unit comprises a rotatable disc containing, along a first circular track, conductive elements defining a series of dialing pulse trains representative of the stored predetermined dialing number, wherein each dialing pulse train contains a number of pulses representative of a separate digit of the stored predetermined dialing number and further containing, along a second circular track, conductive elements defining a series of message pulse trains representative of the stored predetermined message wherein each message pulse train contains a number of pulses representative of the separate character of the stored predetermined message, a first conductive wiper positioned to make contact with the conductive elements along the first circular track and operatively coupled to the dialing pulse switch for causing dialing of the predetermined number when the disc rotates, and a second conductive wiper positioned to make contact with the conductive elements along the second circular track and operatively coupled to the message transmitter for causing transmission of the stored predetermined message as the disc continues to rotate subsequent to the dialing of the predetermined number;

a line seizure switch which is operable for switching the telephone lines to connection with the message transmitter; and a system control circuit which is operatively coupled to the information storage and retrieval unit for actuating the latter in response to a said sensed alarm condition, and which system control circuit is operatively coupled to the line seizure switch for switching the telephone lines to connection with the message transmitter in response to a said sensed alarm condition, which alarm system is characterized by the feature that the rotatable disc further comprises a conductive end-of-message indicator element which is disposed in relation to the conductive elements along the first and second circular tracks and in relation to the first and second conductive wipers such that when it is scanned by a conductive wiper an indication is provided that the conductive elements along the second circular track have been completely scanned and that the scanning of the conductive elements along the first circular track has not again commenced, which provided indication, when combined with a signal which is furnished from the system control circuit to the information storage and retrieval unit indicating that a said sensed alarm condition is no longer being indicated to the system control circuit from a said alarm condition indicator, causes the rotatable disc to stop rotating at this end-of-message position.

2. An alarm system wherein in response to a sensed alarm condition a dialing pulse switch is operated to dial a predetermined dialing number on the telephone lines and a predetermined message is then transmitted over the telephone lines, comprising a dial pulse switch for dialing a predetermined number on the telephone lines;

a message transmitter for transmitting a predetermined message over the telephone lines;

an information storage and retrieval unit operatively coupled to the dial pulse switch and to the message transmitter and containing a stored predetermined dialing number and a stored predetermined message, which information storage and retrieval unit, in response to a said sensed alarm condition, operates the dial pulse switch to dial the stored predetermined dialing number and provides to the message transmitter a stored predetermined message for transmission, wherein the alarm system is characterized by the feature that the information storage and retrieval unit comprises a rotatable disc containing, along a first circular track, conductive elements defining a series of dialing pulse trains representative of the stored predetermined dialing number, wherein each dialing pulse train contains a number of pulses representative of a separate digit of the stored predetermined dialing number and further containing, along a second circular track, conductive elements defining a series of message pulse trains representative of the stored predetermined message wherein each message pulse train contains a number of pulses representative of a separate character of the stored predetermined message, a first conductive wiper positioned to make contact with the conductive elements along the first circular track and operatively coupled to the dialing pulse switch for causing dialing of the predetermined number when the disc rotates, and a second conductive wiper positioned to make contact with the conductive elements along the second circular track and operatively coupled to the message transmitter for causing transmission of the stored predetermined message as the disc continues to rotate subsequent to the dialing of the predetermined number; and an alarm receiver operatively coupled to the message transmitter for graphically displaying a separate character of the predetermined message in response to each said message pulse train, which alarm receiver comprises an input amplifier for providing a series of message pulse trains in response to the receipt of a said transmitted predetermined message, a first signal converter operatively coupled to the input amplifier for providing a separate pulse for each message pulse train, each of which separate pulses has a duration equal to that of its corresponding message pulse train, a ring counter operatively coupled to the first signal converter for sequentially providing on one of a plurality of output lines at a time a series of enabling pulses in response to the pulses received from the first signal converter, a plurality of digit gates operatively coupled to the input amplifier and to the ring counter wherein each digit gate is operatively coupled to a separate output line from the ring counter, which plurality of digit gates are sequentially opened one at a time in response to the enabling pulses from the ring counter for sequentially and separately providing on their respective output lines a single message pulse train, and a plurality of digit display units each being operatively coupled to a separate digit gate for graphically displaying a separate character of a said predetermined message in response to the message pulse train received from its respective digit gate.

3. An alarm system according to claim 2 further characterized by a second signal converter operatively coupled to the input amplifier, to the ring counter and to the digit display units, for providing, in response to the series of message pulse trains from the input amplifier, a reset signal comprising a single reset pulse having the duration of the series of message pulse trains, which reset signal is provided to the ring counter and to the digit display unit for resetting them to their initial condition at the beginning of a said single reset pulse.

4. An alarm system according to claim 2 characterized by a return tone generator and by a return tone timer which when actuated causes the return tone generator to provide a return signal having a predetermined duration over the telephone lines to the message transmitter, wherein the return tone timer is operatively coupled to the input amplifier for suppressing the input amplifier from providing a series of message pulse trains while a return signal is being provided.

5. An alarm system wherein in response to a sensed alarm condition a dialing pulse switch is operated to dial a predetermined dialing number on the telephone lines and a predetermined message is then transmitted over the telephone lines, comprising a dial pulse switch for dialing a predetermined number on the telephone lines;

a message transmitter for transmitting a predetermined message over the telephone lines;

an information storage and retrieval unit operatively coupled to the dial pulse switch and to the message transmitter and containing a stored predetermined dialing number and a stored predetermined message, which information storage and retrieval unit, in response to a said sensed alarm condition, operates the dial pulse switch to dial the stored predetermined dialing number and provides to the message transmitter a stored predetermined message for transmission, wherein the alarm system is characterized by the feature that the information storage and retrieval unit comprises a rotatable disc containing, along a first circular track, conductive elements defining a series of dialing pulse grains representative of the stored predetermined dialing number, wherein each dialing pulse train contains a number of pulses representative of a separate digit of the stored predetermined dialing number and further containing, along a second circular track, conductive elements defining a series of message pulse trains representative of the stored predetermined message wherein each message pulse train contains a number of pulses representative of a separate character of the stored predetermined message, a first conductive wiper positioned to make contact with the conductive elements along the first circular track and operatively coupled to the dialing pulse switch for causing dialing of the predetermined number when the disc rotates, and a second conductive wiper positioned to make contact with the conductive elements along the second circular track and operatively coupled to the message transmitter for causing transmission of the stored predetermined message as the disc continues to rotate subsequent to the dialing of the predetermined number; and an alarm receiver operatively coupled to the message transmitter for graphically displaying a separate character of the predetermined message in response to each said message pulse train, which alarm receiver comprises an answering switch circuit operatively coupled to the telephone lines, which answering switch circuit comprises a line seizure switch normally in an "on hook" position, wherein the answering switch circuit is operatively responsive to a ringing signal provided over the telephone lines thereto for operating the line seizure switch to remove the line seizure switch from the "on hook" position and to operatively couple the telephone lines to the alarm receiver.

6. An alarm system according to claim 5 further characterized by a return tone generator and by a return tone timer operatively coupled to the answering switch circuit, which return tone timer when actuated causes the return tone generator to provide a return signal having a predetermined duration over the telephone lines to the message transmitter, and which return tone timer provides to the answering switch circuit, upon the termination of a said predetermined duration, a signal for returning the line seizure switch to the "on hook" position.

7. An alarm system according to claim 5 further characterized by an "on hook" timer which is operatively coupled to the answering switch for limiting the duration of the operation of the alarm receiver, which "on hook" timer commences operation for a predetermined duration upon receipt of a signal provided from the answering switch at such time as the line seizure switch is removed from the "on hook" position and which "on hook" timer provides upon the termination of the predetermined duration a signal to the answering switch for returning the line seizure switch to the "on hook" position.

8. An alarm system wherein in response to a sensed alarm condition a predetermined message is transmitted, comprising a message transmitter for transmitting a predetermined message, wherein the predetermined message comprises a series of message pulse trains representative of the stored predetermined message, wherein each message pulse train contains a number of pulses representative of a separate character of the predetermined message; and an alarm receiver operatively coupled to the message transmitter for graphically displaying a separate character of the predetermined message in response to each said transmitted message pulse train, which alarm receiver comprises an input amplifier for providing a series of message pulse trains in response to the receipt of a said transmitted predetermined message, a first signal converter operatively coupled to the input amplifier for providing a separate pulse for each message pulse train, each of which separate pulses has a duration equal to that of its corresponding message pulse train, a ring counter operatively coupled to the first signal converter for sequentially providing on one of a plurality of output lines at a time a series of enabling pulses in response to the pulses received from the first signal converter, a plurality of digit gates operatively coupled to the input amplifier and to the ring counter wherein each digit gate is operatively coupled to a separate output line from the ring counter, which plurality of digit gates are sequentially opened one at a time in response to the enabling pulses from the ring counter for sequentially and separately providing on their respective output lines a single message pulse train, and a plurality of digit display units each being operatively coupled to a separate digit gate for graphically displaying a separate character of a said predetermined message in response to the message pulse train received from its respective digit gate.

9. An alarm system according to claim 8 further characterized by a second signal converter operatively coupled to the input amplifier, to the ring counter and to the digit display unit, for providing in response to the series of message pulse trains from the input amplifier, a reset signal comprising a single reset pulse having the duration of the series of message pulse trains, which reset signal is provided to the ring counter and to the digit display unit for resetting them to their initial condition at the beginning of a said single reset pulse.

10. An alarm system according to claim 8 characterized by a return tone generator and by a return tone timer which when actuated causes the return tone generator to provide a return signal having a predetermined duration to the message transmitter, wherein the return tone timer is operatively coupled to the input amplifier for suppressing the input amplifier from providing a series of message pulse trains while a return tone signal is being provided.

11. An alarm system wherein in response to a sensed alarm condition a predetermined message is transmitted, comprising a message transmitter for transmitting a predetermined message, wherein the predetermined message comprises a series of message pulse trains representative of the stored predetermined message, wherein each message pulse train contains a number of pulses representative of a separate character of the predetermined message; and wherein the alarm system is characterized by an alarm receiver operatively coupled to the message transmitter for graphically displaying a separate character of the predetermined message in response to each said transmitted message pulse train, which alarm receiver comprises an answering switch circuit operatively coupled to telephone lines which operatively coupled the message transmitter to the alarm receiver, which answering switch circuit comprises a line seizure switch normally in an "on hook" position, wherein the answering switch circuit is operatively responsive to a ringing signal provided over the telephone lines thereto for operating the line seizure switch to remove the line seizure switch from the "on hook" position and to operatively couple the telephone lines to the alarm receiver.

12. An alarm system according to claim 1 further characterized by a return tone generator and by a return tone timer operatively coupled to the answering switch circuit, which return tone timer when actuated causes the return tone generator to provide a return signal having a predetermined duration over the telephone lines to the message transmitter, and which return tone timer provides to the answering switch circuit, upon the termination of a said predetermined duration, a signal for returning the line seizure switch to the "on hook" position.

13. An alarm system according to claim 11 further characterized by an "on hook" timer which is operatively coupled to the answering switch for limiting the duration of the operation of the alarm receiver which "on hook" timer commences operation for a predetermined duration upon receipt of a signal provided from the answering switch at such time as the line seizure switch is removed from the "on hook" position and which "on hook" timer provides, upon the termination of the predetermined duration, a signal to the answering switch for returning the line seizure switch to the "on hook" position.

14. An alarm system wherein in response to a sensed alarm condition a dial pulse switch is operated to dial a predetermined dialing number on the telephone lines and a predetermined message is then transmitted over the telephone line, comprising a dial pulse switch for dialing a predetermined number on the telephone lines;

a message transmitter for transmitting a predetermined message over the telephone lines; and an information storage and retrieval unit operatively coupled to the dial pulse switch and to the message transmitter and containing a stored predetermined dialing number and a stored predetermined message, which information storage and retrieval unit, in response to a said sensed alarm condition, operates the dial pulse switch to dial the stored predetermined dialing number and provides to the message transmitter a stored predetermined message for transmission, wherein the alarm system is characterized by a timer which is operatively coupled to the information storage and retrieval unit, which timer is actuated to operate for a predetermined duration simultaneously with the information storage and retrieval unit commencing operation in response to a said sensed alarm condition and which timer, upon completion of operation for a said predetermined duration, provides a signal to the information storage and retrieval unit for enabling the termination of the operation thereof.

15. An alarm system according to claim 14 further characterized by the feature that the information storage and retrieval unit provides an end-of-message indication that the predetermined message has been provided to the message transmitter and that the operation of the dial pulse switch has not again commenced, which provided indication when combined with the enabling signal causes the information storage and retrieval unit to terminate operation at this end-of-message position.

16. An alarm system according to claim 14 further comprising a line seizure switch which is operable for switching the telephone lines to connection with the message transmitter, which alarm system is further characterized by a system control circuit which is operatively coupled to the timer and to the information storage and retrieval unit for actuating both simultaneously in response to a said sensed alarm condition, and which system control circuit is operatively coupled to the line seizure switch for switching the telephone lines to connection with the message transmitter in response to a said sensed alarm condition; and by the feature that the timer, upon completion of operation for a said predetermined duration, provides a signal to the system control circuit for enabling the latter to operate the line seizure switch for switching the telephone lines from connection with the message transmitter.

17. An alarm system according to claim 14 wherein the information storage and retrieval unit comprises a rotational disc containing, along a first circular track, conductive elements defining a series of dialing pulse trains representative of stored predetermined dialing number, wherein each dialing pulse train contains a number of pulses representative of a separate digit of the stored predetermined dialing number and further containing, along a second circular track, conductive elements defining a series of message pulse trains representative of the stored predetermined message wherein each message pulse train contains a number of pulses representative of a separate character of the stored predetermined message;

a first conductive wiper positioned to make contact with the conductive elements along the first circular track and operatively coupled to the dialing pulse switch for causing dialing of the predetermined number when the disc rotates; and a second conductive wiper positioned to make contact with the conductive elements along the second circular track and operatively coupled to the message transmitter for causing transmission of the stored predetermined messsage as the disc continues to rotate subsequent to the dialing of the predetermined number.

18. An alarm system according to claim 18, wherein the rotatable disc further comprises a conductive end-of-message indicator element which is disposed in relation to the conductive elements along the first and second circular tracks and in relation to the first and second conductive wipers such that when it is scanned by a conductive wiper an indication is provided that the conductive elements along the second circular track have been completely scanned and that the scanning of the conductive elements along the first circular track has not again commenced, which provided indication when combined with said enabling signal causes the rotatable disc to stop rotating at the end-of-message location.

* * * * *

UNITED STATES PATENT OFFICE

CERTIFICATE OF CORRECTION

Patent No. 3,626,098 Dated December 7, 1971

Inventor(s) John H. Lee

It is certified that error appears in the above-identified patent and that said Letters Patent are hereby corrected as shown below:

Column 1, line 36, change "contacts. Also these conductive wipers" to -- Glidden patent --; and line 48, change "Alsoq" to -- Also, --.

Column 5, line 12, change "long" to -- along --;

line 25, change "element" to -- elements--; and line 60, change "rack" to -- track --.

Column 9, line 52, change "86-85" to -- counter 85 --.

Column 11, line 4, change "CB88" to -- CR88 --; and line 47, change "R150" to -- R140 --.

Column 15, line 46, change "grains" to -- trains --.

Column 17, line 33, change "1" to -- 11 --.

Column 18, line 37, change "rotational" to -- rotatable --; and line 60, change "18" (second occurrence) to -- 17 --.

Signed and sealed this 22nd day of August 1972.

(SEAL)
Attest:

EDWARD M.FLETCHER,JR.
Attesting Officer

ROBERT GOTTSCHALK
Commissioner of Patents